United States Patent [19]

Peels

[11] Patent Number: 4,900,980

[45] Date of Patent: Feb. 13, 1990

[54] COLOR DISPLAY TUBE

[75] Inventor: Antonius H. P. M. Peels, Eindhoven, Netherlands

[73] Assignee: U.S. Philips Corporation, New York, N.Y.

[21] Appl. No.: 802,068

[22] Filed: Nov. 25, 1985

Related U.S. Application Data

[63] Continuation of Ser. No. 516,028, Jul. 22, 1983, abandoned.

[30] Foreign Application Priority Data

Aug. 25, 1982 [NL] Netherlands ........................ 8203320

[51] Int. Cl.4 ............................................ H01S 29/48

[52] U.S. Cl. ........................................ 313/414; 445/36

[58] Field of Search .................. 313/413, 414; 445/34, 445/36

[56] References Cited

FOREIGN PATENT DOCUMENTS 54-139464 10/1979 Japan .................................... 445/36

57-98962 6/1982 Japan .................................... 313/414

*Primary Examiner*—Donald J. Yusko

*Assistant Examiner*—Sandra L. O'Shea

*Attorney, Agent, or Firm*—Robert J. Kraus

[57] ABSTRACT

The astigmatism of the electron beams (6, 7, 8) generated by an electron gun system (5) are substantially reduced by constructing the lens electrode components (25, 26) between which a focusing lens is formed in an operating electron gun to be inverted replicas of each other. The lens electrode components should be provided with the corresponding sides (45, 46) facing each other and with the corresponding apertures (38, 42) opposite to each other.

4 Claims, 2 Drawing Sheets

COLOR DISPLAY TUBE

This is a continuation of application Ser. No. 516,028 filed on July 22, 1983 now abandoned.

BACKGROUND OF THE INVENTION

The invention relates to a colour display tube of the "in-line" type comprising in an evacuated envelope an electron gun system for generating three electron beams situated with their axes in one plane. Such a system comprises at least one focusing lens for each beam for focusing the electron beams on a display screen. The focusing lens in the operating display tube is formed by applying a suitable potential difference between first and second lens electrodes which are common to the three electron beams, with lens electrodes each comprise a plate-shaped part which has a central aperture and first and second side apertures situated symmetrically with respect to the central aperture, through which apertures the three electron beams pass.

Such a colour display tube is known from Netherlands Patent Application No. 7 904 114, corresponding to U.S. Pat. No. 4,337,409. The focusing lenses of the integrated electron gun system shown in the above mentioned Patent Application comprises two lens electrodes each consisting of a few electrode components. The two parts of the lens electrodes between which the focusing lenses are formed in the operating display tube by applying a suitable potential difference each consist of a cup-shaped part, the bottom of which has a central aperture and first and second side apertures, through which apertures the electron beams pass. Moreover, each aperture comprises a collar. The diameters of the apertures in the oppositely located parts of the first and second lens electrodes are different.

Colour display tubes are also known, for example, from prior art illustrations in Netherlands Patent Application No. 7 809 160, corresponding to U.S. Pat. No. 4,291,251, in which the distance between the centre of the central aperture and the centre of a side aperture in the first lens electrode is smaller than in the second lens electrode to obtain in this manner static convergence of the three electron beams. This quite generally used method of static convergence, however, results in a substantial beam displacement and/or an asymmetric haze around the spot of the display screen of the outermost electron beams. A better way of obtaining static convergence is described in the above mentioned Netherlands Patent Application No. 7 809 160 corresponding to to U.S. Pat. No. 4,291,251. In the electron gun system described in the patent, the outermost electron beams are deflected in the triode part of the electron gun system and focused symmetrically by tilted focusing lenses. Nevertheless, the sharpness of the spot on the display screen of such tubes often leaves much to be desired. This is the result of astigmatism which results in a non-circular spot or haze around the spot. The astigmatism is caused by errors in the manufacture of the lens electrodes, for example, the non-circularity of the apertures.

SUMMARY OF THE INVENTION

It is therefore an object of the invention to provide a colour display tube in which measures are taken to considerably reduce the astigmatism.

For that purpose, according to the invention, a colour display tube of the kind described in the opening paragraph is characterized in that the plate-shaped parts with apertures are identical and face each other with their corresponding sides, and the first side aperture in the first lens electrode is situated opposite to the first side aperture in the second lens electrode. The plate-shaped parts are identical with respect to design, production period and manufacturing tool and are thus replicas of each other.

The invention is based on the experimentally gained recognition that the main cause of the astigmatism is the non-circularity of the apertures in the lens electrodes. Furthermore, errors in the second lens electrode have a greater adverse influence on the electron beam and hence on the spot than similar errors in the first lens electrode. It also holds that the spreading of the mechanical errors in a group of lens electrodes manufactured by means of the same tool is small. According to the invention, by providing identical components for the lens electrodes in the above-described manner opposite to each other it is achieved that the deviations of the oppositely located apertures are approximately equally large, but inverted with respect to each other. As a result of this the influence on the electron beams of the deviations in the two lens electrodes is approximately equal, but of opposite sign, as a result of which the overall remaining astigmatism becomes small.

Because the distance between the centres of the central aperture and side apertures for the first and second lens electrodes are equal, the static convergence must be realized in a different manner. This may be done in known manner by deflecting the outermost electron beams in the triode part of the electron gun system and causing them to pass through the centre of the focusing lenses.

In the electron gun system according to the invention the remaining astigmatism is always negative. In practice, however, no astigmatism or only a small positive astigmatism is desired. This can be obtained by means of an extra field correction element as described, for example, in Netherlands Patent Application No. 8203322 of even date, corresponding to U.S. patent application 516,016 filed on July 22, 1983, which is incorporated herein by reference, or, for example, by means of separate extra collars extending from the apertures in the lens electrodes.

The apertured, plate-shaped parts preferably form the bottom of two substantially identical cup-shaped lens electrodes.

It is also possible for the apertures in the plate-shaped parts to communicate with each other so that no Overlapping Lens Field (O.L.F.) electron lens is formed. Such an O.L.F. electron lens is described inter alia in Netherlands Patent Application No. 8203321 of even date, corresponding to U.S. patent application 516,029 filed on July 22, 1983, which is incorporated herein by reference.

Identical lens components can be manufactured by manufacturing them in a certain production period by means of the same tool. In order to prevent errors in assembly, the lens electrode components may be provided with a mark. Always two lens electrode components are taken from the group of lens electrode components manufactured by means of the same tool and are positioned opposite to each other and assembled in the electron gun system in the manner according to the invention.

BRIEF DESCRIPTION OF THE DRAWING

The invention will now be described in greater detail, by way of example, with reference to a drawing, in which.

DESCRIPTION OF THE PREFERRED EMBODIMENT

Figure 1:
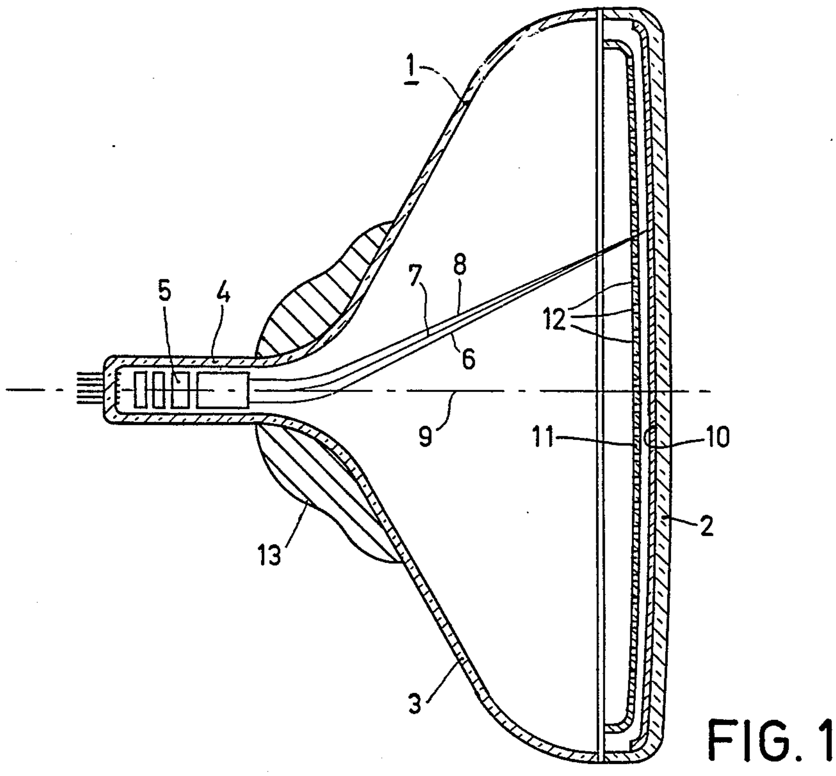
FIG. 1 is a longitudinal sectional view of a colour display tube according to the invention.
Figure 2:
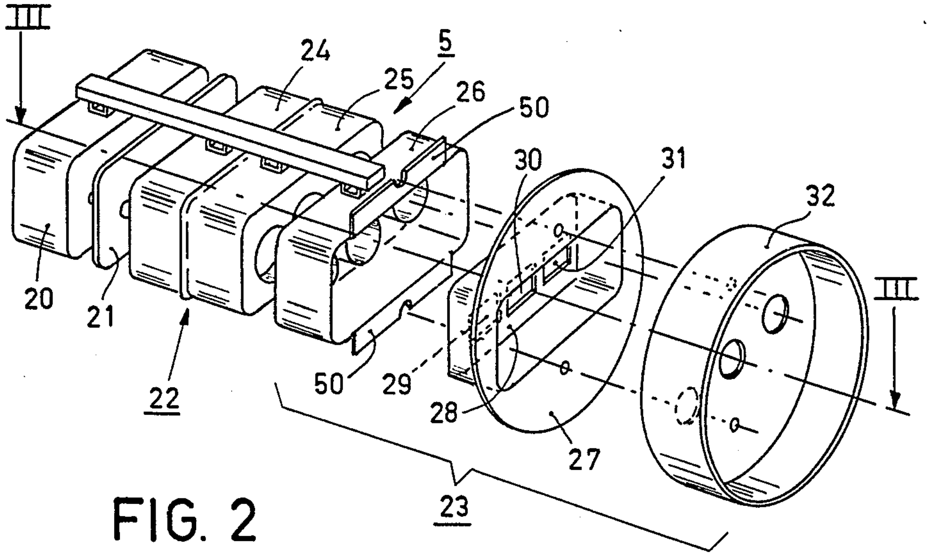
FIG. 2 is a perspective exploded view of an embodiment of an electron gun system as used in the FIG. 1 tube.
Figure 3:
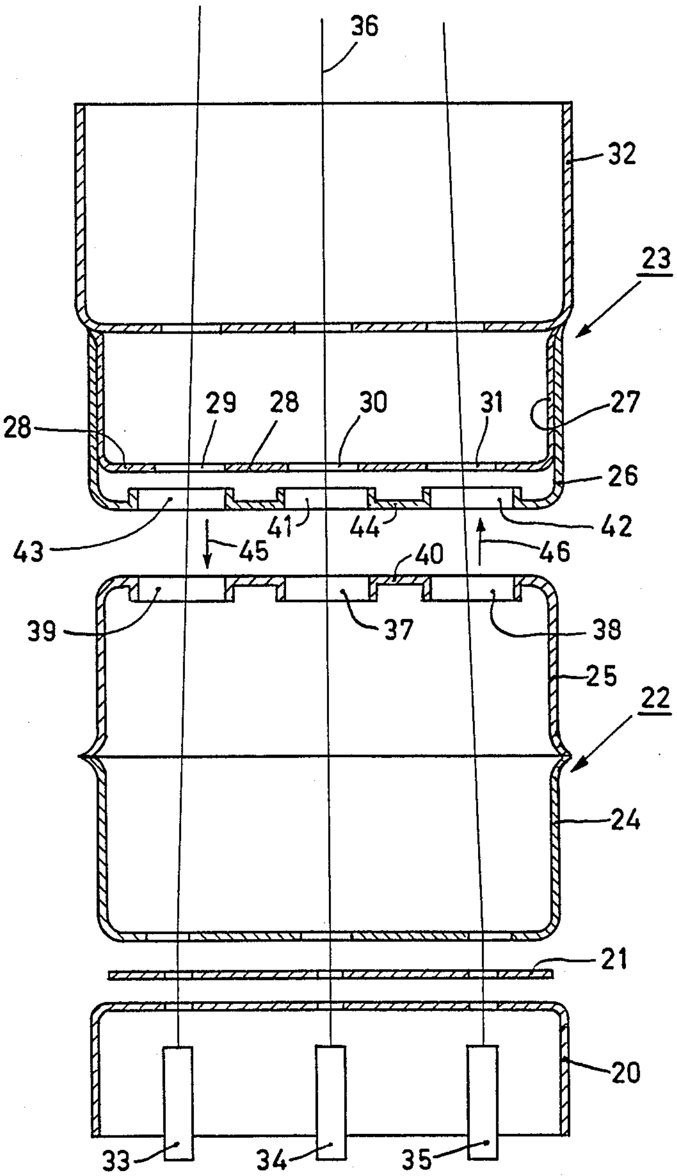
FIG. 3 is a longitudinal sectional view of the electron gun system shown in FIG. 2.

FIG. 1 is a longitudinal sectional view of a colour display tube of the "in-line" type. In the neck of a glass envelope 1 which is composed of a display window 2, a cone 3 and a neck 4, an integrated electron gun system 5 is provided which generates three electron beams 6, 7 and 8 which are situated with their axes in the plane of the drawing. The axis of the central electron beam 7 coincides with the tube axis 9. The display window 2 comprises on its inside a large number of triplets of phosphor lines. Each triplet comprises a line consisting of a blue-luminescing phosphor, a line consisting of a green-luminescing phosphor, and a line consisting of a red-luminescing phosphor. All triplets together constitute the display screen 10. The phosphor lines are perpendicular to the plane of the drawing. In front of the display screen, a shadow mask 11 is positioned in which a very large number of elongate apertures 12 are provided through which the electron beams 6, 7 and 8 pass, each of which beams impinges only on phosphor lines of one colour. The three electron beams situated in one plane are deflected by a system 13 of deflection coils. FIG. 2 is a perspective exploded view of an electron gun system as used in a colour display tube shown in FIG. 1. The electron gun system comprises a common cup-shaped control electrode 20, in which three cathodes (not visible) are connected, and a common plate-shaped anode 21. Cathode, control electrode and anode together constitute the triode part of the electron gun system. The three electron beams situated with their axes in one plane are focused by means of the first lens electrode 22 and the second lens electrode 23 which are common to the three electron beams. Electrode 22 consists of two cup-shaped lens electrode components 24 and 25 which are connected together at their open ends. The second lens electrode 23 comprises a cup-shaped lens electrode component 26, a field correction element 27 which is also substantially cup-shaped and which has a plate-shaped part 28 having rectangular apertures 29, 30 and 31, and a centering sleeve 32 which is used for centering the electron gun system in the tube neck. The lens electrode components 25 and 26 are substantially identical and assembled with respect to each other according to the invention. The only difference between the lens electrode components 25 and 26 are the connection flanges 50 of lens electrode component 26 which, however, have no electron-optical effect. FIG. 3 is a longitudinal sectional view of the electron gun system shown in FIG. 2. Three cathodes 33, 34 and 35 are present in the control electrode 20 to generate three electron beams. The axis 36 of the central electron gun coincides with the tube axis.

Electrode component 25 has a central aperture 37, a first side aperture 38, and a second side aperture 39 in the plate-shaped part 40. Electrode component 26 is identical to electrode component 25 and also has a central aperture 41, a first side aperture 42 and a second side aperture 43 in the plate-shaped part 44. The first side aperture 38 in the lens electrode component 25 is situated opposite to the first side aperture 42 in the second lens electrode component 26. The side apertures 38 and 42 are made in the same location and in the same manner in the tool so that they are identical and hence show the same characteristics. The corresponding sides 45 and 46 of the plate-shaped parts 40 and 44 face each other. The apertures have collars extending in the electrodes. By making the electrode components 25 and 26 identical and assembling them oppositely to each other according to the invention, the astigmatism is considerably reduced and only a small negative astigmatism remains.

However, instead of a small negative astigmatism, often no astigmatism or a small positive astigmatism is desired. This can be obtained by providing the field correction element 27 which forms the subject matter of the already mentioned Netherlands Patent Application No. 8203322 of even date, corresponding to U.S. patent application 516,016 filed on July 22, 1983.

Whether the lens electrode components are identical can be simply established. Each piece of tool used in the manufacture of the lens electrode components leaves unambiguous traces. The deviation in the circularity of the apertures in two lens electrode components sequentially manufactured by means of the same tool will also be identical. It will be obvious that the invention may also be used in electron gun systems having focusing lenses consisting of more electrodes.

The invention may also be used in electron gun system having a so-called Overlapping Lens Field (O.L.F.) electron lens for focusing the electron beams. The apertures in each of the plate-shaped parts 40 and 44 in that case communicate with each other and constitute, for example, one peanut-shaped aperture. A peanut shaped aperture is an elongate aperture formed by three overlapping circular apertures. By making two lens components which form the O.L.F. focusing lens identical and then positioning them opposite to each other according to the invention, the astigmatism is reduced. Such an O.L.F. focusing lens is described in I.E.E.E. Transactions on Consumer Electronics, Vol. C.E., Aug. 26, 1980, page 458, which article is incorporated herein by reference, and in the already mentioned co-pending Netherlands Patent Application No. 8203321 of even date, corresponding to U.S. patent application 516,029 filed on July 22, 1983.

What is claimed is:

1. A color display tube comprising an evacuated envelope containing a luminescent screen and an electron gun system for producing a central electron beam and first and second outer electron beams lying in a single plane, said electron gun system including first and second spaced-apart lens electrodes, each having a plate-shaped part defining central and first and second outer apertures for passing the respective electron beams, said lens electrodes being responsive to an applied potential difference to collectively effect production of an electrical focusing lens for focusing the electron beams onto the luminescent screen;

characterized in that said plate-shaped parts are selected from a batch of the parts manufactured by the same tool during the same production period and have geometrically-identical apertures, any geometrical imperfections of the apertures in one of the plate-shaped parts also substantially existing in the other, said parts being arranged with corresponding sides facing each other such that their central and first and second outer apertures are aligned with each other but are inverted with respect to each other, any imperfections in one plate also appearing in the other plate but on opposite side of said plane, said arrangement reducing any astigmatic effect of the imperfections on beam focusing.

2. A color display tube as in claim 1 where each of said lens electrodes comprises a cup-shaped electrode having a bottom formed by the respective plate-shaped part.

3. A method of assembling a color display tube comprising an evacuated envelope containing a luminescent screen and an electron gun system for producing a central electron beam and first and second outer electron beams lying in a single plane, said electron gun system including first and second spaced-apart lens electrodes, each having a plate-shaped part defining central and first and second outer apertures for passing the respective electron beams, said lens electrodes being responsive to an applied potential difference to collectively effect production of an electrical focusing lens for focusing the electron beams onto the luminescent screen;

characterized in that the plate-shaped parts are assembled by:

(a) selecting two of said parts from a batch of the parts which were all manufactured by the same tool during the sam production period and have geometrically-identical apertures, any geometrical imperfections of the apertures in one of the plate-shaped parts also substantially existing in the other; and (b) arranging the parts with corresponding sides facing each other such that their central and first and second outer apertures are aligned with each other but are inverted with respect to each other, any imperfections in one plate also appearing in the other plate but on the opposite side of said plane, said arrangement reducing any astigmatism effect of the imperfections on beam focusing.

4. A method of assembling a color display tube as in claim 3 where each of said lens electrodes comprises a cup-shaped electrode having a bottom formed by the respective plate-shaped part.

* * * * *